US011987703B2

(12) United States Patent
Washizu

(10) Patent No.: US 11,987,703 B2
(45) Date of Patent: May 21, 2024

(54) RUBBER COMPOSITION AND TIRE

(71) Applicant: Sumitomo Rubber Industries, Ltd., Hyogo (JP)

(72) Inventor: Kensuke Washizu, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 408 days.

(21) Appl. No.: 17/261,843

(22) PCT Filed: Jul. 23, 2019

(86) PCT No.: PCT/JP2019/028826
§ 371 (c)(1),
(2) Date: Jan. 20, 2021

(87) PCT Pub. No.: WO2020/022325
PCT Pub. Date: Jan. 30, 2020

(65) Prior Publication Data
US 2021/0301109 A1 Sep. 30, 2021

(30) Foreign Application Priority Data
Jul. 27, 2018 (JP) .................................. 2018-141904

(51) Int. Cl.
*C08L 9/00* (2006.01)
*B60C 1/00* (2006.01)
*C08L 9/06* (2006.01)
*C08L 15/00* (2006.01)
*C08L 71/02* (2006.01)
*C08L 71/03* (2006.01)

(52) U.S. Cl.
CPC .............. *C08L 9/00* (2013.01); *B60C 1/0016* (2013.01); *C08L 9/06* (2013.01); *C08L 15/00* (2013.01); *C08L 71/02* (2013.01); *C08L 71/03* (2013.01)

(58) Field of Classification Search
CPC .... C08L 9/00; C08L 9/06; C08L 15/00; C08L 71/02; C08L 71/03; B60C 1/0016
See application file for complete search history.

(56) References Cited

U.S. PATENT DOCUMENTS

| 6,075,092 A | 6/2000 | Nakamura et al. |
| 2015/0126674 A1 | 5/2015 | Sato |
| 2017/0102635 A1 | 4/2017 | Kuroda et al. |

FOREIGN PATENT DOCUMENTS

| CN | 103140504 A | 6/2013 |
| CN | 108623800 A | 10/2018 |
| DE | 24 37 881 A1 | 2/1976 |
| EP | 0 779 330 A1 | 6/1997 |
| EP | 0 894 824 A1 | 2/1999 |
| EP | 1 376 617 A2 | 1/2004 |
| EP | 2 977 227 A1 | 1/2016 |
| GB | 1093825 A | 12/1967 |
| JP | H07-090123 A | 4/1995 |
| JP | 2000-239445 A | 9/2000 |
| JP | 2003-128839 A | 5/2003 |
| JP | 2004-123887 A | 4/2004 |
| JP | 2006-028337 A | 2/2006 |
| JP | 2006-213864 A | 8/2006 |
| JP | 2008-285524 A | 11/2008 |
| JP | 2010-144050 A | 7/2010 |
| JP | 2014-012798 A | 1/2014 |
| JP | 2016-125000 A | 7/2016 |
| JP | 2017-214060 A | 12/2017 |
| WO | 97/39055 A1 | 10/1997 |
| WO | 2012/044318 A1 | 4/2012 |

OTHER PUBLICATIONS

International Search Report issued in PCT/JP2019/028826; dated Oct. 29, 2019.

*Primary Examiner* — Kregg T Brooks
*Assistant Examiner* — David R. Foss
(74) *Attorney, Agent, or Firm* — Studebaker & Brackett PC

(57) ABSTRACT

The present invention aims to provide rubber compositions and tires which provide improved overall performance in terms of wet grip performance and dry grip performance. The present invention relates to a rubber composition having a hardness that reversibly changes with water and satisfying the following relationship (1):

Hardness when dry−Hardness when water-wet≥10      (1)

wherein each hardness represents the JIS-A hardness at 25° C. of the rubber composition.

14 Claims, No Drawings

RUBBER COMPOSITION AND TIRE

TECHNICAL FIELD

The present invention relates to rubber compositions and tires.

BACKGROUND ART

In recent years, safety has become an increasingly important issue for all automobiles. This has created a need for further improving wet grip performance. To date, various studies have been made to improve wet grip performance, and many inventions directed to silica-containing rubber compositions have been reported (for example, Patent Literature 1). Wet grip performance may be greatly affected particularly by the properties of the rubber composition of the tread portion that contacts the road. Thus, a variety of technical improvements in rubber compositions for tire components such as treads have been proposed and put into practical use.

CITATION LIST

Patent Literature

Patent Literature 1: JP 2008-285524 A

SUMMARY OF INVENTION

Technical Problem

As a result of extensive studies, the present inventor has found that, although the wet grip performance of tires has greatly advanced with the technical improvements of silica-containing rubber compositions for treads, there still remains the major technical problem of changes in grip performance caused by, for example, changes in road conditions from dry to wet road, or from wet to dry road, and thus room for improvement exists.

The inventor has extensively investigated this problem and found that when the conventional rubber compounds change from a dry state where they are not wet with water to a so-called wet state where they are wet with water, they will not change in hardness or will become harder due to cooling with water. Thus, the road contact area may be reduced and therefore the wet grip performance tends to be reduced compared to the dry grip performance.

Hence, it has been found that the conventional techniques leave room for improvement to improve overall performance in terms of wet grip performance and dry grip performance.

The present invention aims to solve the problem and provide rubber compositions and tires which provide improved overall performance in terms of wet grip performance and dry grip performance.

Solution to Problem

The present invention relates to a rubber composition, having a hardness that reversibly changes with water and satisfying the following relationship (1):

$$\text{Hardness when dry} - \text{Hardness when water-wet} \geq 10 \quad (1)$$

wherein each hardness represents a JIS-A hardness at 25° C. of the rubber composition.

The relationship (1) is preferably as follows: Hardness when dry−Hardness when water-wet≥11, more preferably $Z \geq 12$, still more preferably ≥13.

The rubber composition preferably contains a diene rubber, and a polymer having a carbon-carbon double bond and a heteroatom.

The heteroatom is preferably at least one atom selected from the group consisting of an oxygen atom, a nitrogen atom, a silicon atom, a sulfur atom, a phosphorus atom, and halogen atoms.

Preferably, the polymer includes at least 5% by mass of insolubles when suspended in an amount of 1 g per 10 mL of water.

Preferably, the polymer includes at least 5% by mass of insolubles when suspended in an amount of 1 g per 10 mL of tetrahydrofuran.

The rubber composition preferably includes, per 100 parts by mass of a rubber component therein, at least 5 parts by mass of the polymer.

The rubber composition preferably includes an isoprene-based rubber.

The rubber composition preferably includes a polybutadiene rubber.

The rubber composition preferably has a styrene-butadiene rubber content of 95% by mass or less based on 100% by mass of a rubber component of the rubber composition.

The rubber composition is preferably for use in treads.

The present invention also relates to a tire, including a tire component at least partially including the rubber composition.

The tire component is preferably a tread.

Advantageous Effects of Invention

The rubber composition of the present invention has a hardness that reversibly changes with water, and satisfies the relationship (1). Such a rubber composition provides improved overall performance in terms of wet grip performance and dry grip performance.

DESCRIPTION OF EMBODIMENTS

The rubber composition of the present invention has a hardness that reversibly changes with water, and satisfies the relationship (1) below. Thus, the rubber composition provides improved overall performance in terms of wet grip performance and dry grip performance.

$$\text{Hardness when dry} - \text{Hardness when water-wet} \geq 10 \quad (1)$$

In the relationship, each hardness represents the JIS-A hardness at 25° C. of the rubber composition.

The rubber composition has the above-mentioned effect. The reason for the effect is not exactly clear, but may be explained as follows.

The rubber composition of the present invention has a hardness that reversibly changes with water, and further satisfies the relationship (1). The relationship (1) indicates that the hardness when water-wet is lower than the hardness when dry. In other words, by "the rubber composition of the present invention has a hardness that reversibly changes with water, and further satisfies the relationship (1)", it is meant that the rubber composition has a hardness which is lower when water-wet than when dry and which reversibly changes in the presence of water.

Accordingly, when the road conditions change from dry to wet, the rubber composition gets wet with water and thereby has a reduced hardness, which makes it possible to reduce a decrease in grip performance (wet grip performance), resulting in good grip performance (wet grip performance). This is believed to be because if the hardness remains suitable for dry roads, sufficient grip performance cannot be obtained on wet roads where skidding is more likely to occur; in contrast, a reduced hardness leads to an increased road contact area, which makes it possible to reduce a decrease in grip performance (wet grip performance), resulting in good grip performance (wet grip performance).

On the other hand, when the road conditions change from wet to dry, the water-wet rubber composition gets dry and thereby has an increased hardness, which makes it possible to reduce a decrease in grip performance (dry grip performance), resulting in good grip performance (dry grip performance). This is believed to be because if the hardness remains suitable for wet roads, sufficient grip performance cannot be obtained on dry roads where skidding is less likely to occur; in contrast, an increased hardness, which is suitable for dry roads, makes it possible to reduce a decrease in grip performance (dry grip performance), resulting in good grip performance (dry grip performance).

Thus, the rubber composition having a hardness that reversibly changes with water, and further satisfying the relationship (1) provides an appropriate hardness depending on the water conditions on the road (wet or dry road), and therefore provides improved overall performance in terms of wet grip performance and dry grip performance.

Therefore, the rubber composition of the present invention having a hardness that reversibly changes with water and satisfying the relationship (1) provides improved overall performance in terms of wet grip performance and dry grip performance.

Herein, the hardness and tan δ of the rubber composition refer to the hardness and tan δ, respectively, of the rubber composition having been vulcanized. Moreover, the tan δ is determined by subjecting the vulcanized rubber composition to a viscoelasticity test.

Herein, the phrase "hardness that reversibly changes with water" means that the hardness of the (vulcanized) rubber composition reversibly increases or decreases depending on the presence of water. It is sufficient that the hardness reversibly change when the state of the rubber composition changes, for example, as follows: dry→water-wet→dry. Here, the rubber composition in the former dry state may or may not have the same hardness as in the latter dry state.

Herein, the term "hardness when dry" refers to the hardness of the (vulcanized) rubber composition in the dry state, and specifically refers to the hardness of the (vulcanized) rubber composition which has been dried by the method described in EXAMPLES.

Herein, the term "hardness when water-wet" refers to the hardness of the (vulcanized) rubber composition in the water-wet state, and specifically refers to the hardness of the (vulcanized) rubber composition which has been wetted with water by the method described in EXAMPLES.

Herein, the hardness (JIS-A hardness) of the (vulcanized) rubber composition is measured at 25° C. using a type A durometer in accordance with JIS K6253-3 (2012) "Rubber, vulcanized or thermoplastic—Determination of hardness—Part 3: Durometer method".

Herein, the term "tan δ at 70° C. when dry" refers to the tan δ at 70° C. of the (vulcanized) rubber composition in the dry state, and specifically refers to the tan δ at 70° C. of the (vulcanized) rubber composition which has been dried by the method described in EXAMPLES.

Herein, the tan δ at 70° C. of the (vulcanized) rubber composition represents the loss tangent measured at 70° C., an initial strain of 10%, a dynamic strain of 2%, and a frequency of 10 Hz.

As shown in the relationship (1), the value of "Hardness when dry−Hardness when water-wet" [(the hardness of the (vulcanized) rubber composition in the dry state)−(the hardness of the (vulcanized) rubber composition in the water-wet state)] is 10 or more, preferably 11 or more, more preferably 12 or more, still more preferably 13 or more, particularly preferably 14 or more, most preferably 15 or more, still most preferably 16 or more, further most preferably 18 or more, particularly most preferably 19 or more, further preferably 21 or more, further preferably 24 or more. The upper limit is not limited but is preferably 50 or less, more preferably 40 or less, still more preferably 30 or less, particularly preferably 28 or less, most preferably 26 or less. When the value is within the range indicated above, the advantageous effect can be more suitably achieved.

The "Hardness when dry" (the hardness of the (vulcanized) rubber composition in the dry state) may be appropriately adjusted within the range satisfying the relationship (1). It is preferably 20 or more, more preferably 25 or more, still more preferably 30 or more, particularly preferably 40 or more, most preferably 50 or more, still most preferably 55 or more, further preferably 56 or more, but is preferably 95 or less, more preferably 90 or less, still more preferably 85 or less, particularly preferably 75 or less, most preferably 70 or less, still most preferably 65 or less, further most preferably 60 or less, further preferably 59 or less, further preferably 57 or less. When the hardness is within the range indicated above, the advantageous effect can be more suitably achieved.

The "Hardness when water-wet" (the hardness of the (vulcanized) rubber composition in the water-wet state) may be appropriately adjusted within the range satisfying the relationship (1). It is preferably 20 or more, more preferably 25 or more, still more preferably 30 or more, particularly preferably 32 or more, but is preferably 70 or less, more preferably 60 or less, still more preferably 50 or less, particularly preferably 46 or less, most preferably 45 or less, further preferably 43 or less, further preferably 42 or less, further preferably 41 or less, further preferably 40 or less, further preferably 38 or less, further preferably 37 or less, further preferably 35 or less. When the hardness is within the range indicated above, the advantageous effect can be more suitably achieved.

The rubber composition preferably satisfies the relationship (2) below. This provides good fuel economy.

$$\tan δ \text{ at } 70° \text{ C. when dry} < 0.14 \quad (2)$$

In the relationship, the tan δ at 70° C. represents the loss tangent measured at 70° C., an initial strain of 10%, a dynamic strain of 2%, and a frequency of 10 Hz.

As shown in the relationship (2), the "tan δ at 70° C. when dry" (the tan δ at 70° C. of the (vulcanized) rubber composition in the dry state) is less than 0.14, preferably 0.13 or less, more preferably 0.12 or less, still more preferably 0.11 or less. The lower limit is not limited but is preferably 0.01 or more, more preferably 0.02 or more. When the tan δ is within the range indicated above, the advantageous effect can be more suitably achieved.

A rubber composition having a hardness which changes as shown in the relationship (1) and which reversibly changes with water may be achieved by incorporating a compound capable of forming a reversible molecular bond, such as a hydrogen bond or an ionic bond, with water. More specifically, when a rubber composition contains a combination of a rubber component including a diene rubber with a polymer having a carbon-carbon double bond and a heteroatom, it achieves a hardness which changes as shown in the relationship (1) and which reversibly changes with water. This is because the heteroatom can form a reversible molecular bond, such as a hydrogen bond or an ionic bond, with water in the rubber composition, as a result of which the hardness of the rubber composition in the water-wet state is reduced.

Moreover, owing to the combination, the polymer is crosslinked via its carbon-carbon double bond with the rubber component during vulcanization so that it is fixed to the rubber component. This makes it possible to suppress release of the polymer from the rubber component, thereby suppressing precipitation of the polymer on the rubber surface. Thus, a decrease in grip performance (wet grip performance, dry grip performance) can also be reduced.

The tan δ at 70° C. when dry can be adjusted by the type and amount of the chemicals (in particular, rubber component, fillers, softeners, sulfur, vulcanization accelerators, silane coupling agents) incorporated in the rubber composition. The tan δ at 70° C. tends to be reduced, for example, by using a softener highly compatible with the rubber component, or using a modified rubber, or using silica as filler, or reducing the amount of oil as plasticizer, or increasing the amount of sulfur, or increasing the amount of vulcanization accelerators, or increasing the amount of silane coupling agents.

The hardness when dry can be adjusted by the type and amount of the chemicals (in particular, rubber component, fillers, softeners such as oil) incorporated in the rubber composition. For example, the hardness when dry tends to be reduced by increasing the amount of softeners; the hardness when dry tends to be increased by increasing the amount of fillers; and the hardness when dry tends to be reduced by decreasing the amount of sulfur. The hardness when dry can also be adjusted by varying the amount of sulfur and vulcanization accelerators. More specifically, increasing the amount of sulfur tends to increase the hardness when dry, while increasing the amount of vulcanization accelerators tends to increase the hardness when dry.

More specifically, when the hardness when dry is adjusted within the desired range, and further a rubber component including a diene rubber is combined with a polymer having a carbon-carbon double bond and a heteroatom, the rubber composition achieves a hardness which changes as shown in the relationship (1) and which reversibly changes with water, and at the same time provides a tan δ at 70° C. when dry adjusted within the desired range.

As another means for allowing a rubber composition to achieve a hardness which changes as shown in the relationship (1) and which reversibly changes with water, when a rubber composition contains a combination of a rubber component including a diene rubber with a polymer having a carbon-carbon double bond and a heteroatom, the polymer is crosslinked via its carbon-carbon double bond with the rubber component during vulcanization so that it is fixed to the rubber component. This makes it possible to suppress release of the polymer from the rubber component, so that the rubber composition achieves a hardness which changes as shown in the relationship (1) and which reversibly changes with water.

If the polymer has no carbon-carbon double bond, it may be released into water when the rubber composition comes in contact with water, and therefore reversible changes in hardness may not occur.

As another means for adjusting the tan δ at 70° C. when dry within the range indicated above, when a rubber composition contains a combination of a rubber component including a diene rubber with a polymer having a carbon-carbon double bond and a heteroatom, the polymer is crosslinked via its carbon-carbon double bond with the rubber component during vulcanization so that it is fixed to the rubber component. This makes it possible to suppress release of the polymer from the rubber component, thereby reducing the tan δ at 70° C.

Another means for allowing a rubber composition to achieve a hardness which changes as shown in the relationship (1) and which reversibly changes with water is, for example, to reversibly break or re-form the ionic bond between the rubber molecules through addition of water or drying. More specifically, when a rubber composition contains a combination of a rubber containing a halogen or oxygen with a compound containing a metal, metalloid, or nitrogen, it achieves a hardness which changes as shown in the relationship (1) and which reversibly changes with water. This is because owing to the combination, the cation derived from the metal, metalloid, or nitrogen and the anion derived from the halogen or oxygen form an ionic bond between the rubber molecules, which is then cleaved by addition of water and re-formed by drying of water, with the result that the hardness decreases when water-wet and increases when dry.

The chemicals that may be used are described below.

Examples of the rubber component include diene rubbers such as isoprene-based rubbers, polybutadiene rubber (BR), styrene-butadiene rubber (SBR), styrene-isoprene-butadiene rubber (SIBR), acrylonitrile-butadiene rubber (NBR), chloroprene rubber (CR), and butyl rubber (IIR). The rubber component may include a single rubber or a combination of two or more rubbers. Among these, diene rubbers are preferred, with isoprene-based rubbers, BR, and SBR being more preferred, with SBR being still more preferred. Combinations of isoprene-based rubbers and SBR, combinations of BR and SBR, or combinations of isoprene-based rubbers, BR, and SBR are also preferred.

The rubber component preferably has a weight average molecular weight (Mw) of 150,000 or more, more preferably 350,000 or more. The upper limit of the Mw is not limited but is preferably 4,000,000 or less, more preferably 3,000,000 or less.

The amount of diene rubbers based on 100% by mass of the rubber component is preferably 20% by mass or more, more preferably 50% by mass or more, still more preferably 70% by mass or more, particularly preferably 80% by mass or more, most preferably 90% by mass or more, and may be 100% by mass. When the amount is within the range indicated above, the advantageous effect tends to be better achieved.

The SBR is not limited. Examples include those commonly used in the tire industry, such as emulsion-polymerized SBR (E-SBR) and solution-polymerized SBR (S-SBR). These may be used alone or in combinations of two or more.

The SBR preferably has a styrene content of 10% by mass or higher, more preferably 15% by mass or higher, still more preferably 20% by mass or higher, but preferably 50% by mass or lower, more preferably 40% by mass or lower, still more preferably 30% by mass or lower. When the styrene content is within the range indicated above, the advantageous effect tends to be more suitably achieved.

The SBR preferably has a vinyl content of 10% by mass or higher, more preferably 20% by mass or higher, still more preferably 30% by mass or higher, particularly preferably 40% by mass or higher, most preferably 50% by mass or higher, but preferably 75% by mass or lower, more preferably 65% by mass or lower. The SBR having a vinyl content within the range indicated above tends to have good compatibility with BR, so that the advantageous effect tends to be more suitably achieved.

The SBR may be an unmodified or modified SBR.

The modified SBR may be any SBR having a functional group interactive with a filler such as silica. For example, it may be a chain end-modified SBR obtained by modifying at least one chain end of SBR with a compound (modifier) having the functional group (i.e., a chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group, and at least one chain end is modified with the modifier); or a chain end-modified SBR that has been modified (coupled) with a polyfunctional compound having two or more epoxy groups in the molecule so that a hydroxyl or epoxy group is introduced. These may be used alone or in combinations of two or more.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. Among these, amino (preferably amino whose hydrogen atom is replaced with a C1-C6 alkyl group), alkoxy (preferably C1-C6 alkoxy), alkoxysilyl (preferably C1-C6 alkoxysilyl), and amide groups are preferred.

The SBR may be one manufactured or sold by, for example, Sumitomo Chemical Co., Ltd., JSR Corporation, Asahi Kasei Corporation, or Zeon Corporation.

The amount of SBR based on 100% by mass of the rubber component is preferably 20% by mass or more, more preferably 50% by mass or more, still more preferably 60% by mass or more, but is preferably 95% by mass or less, more preferably 90% by mass or less, still more preferably 80% by mass or less. When the amount is within the range indicated above, the advantageous effect tends to be better achieved.

The BR is not limited. Examples include those commonly used in the tire industry. These may be used alone or in combinations of two or more.

The BR preferably has a cis content of 90% by mass or higher, more preferably 95% by mass or higher, still more preferably 97% by mass or higher. The upper limit of the cis content is not limited and may be 100% by mass. When the cis content is within the range indicated above, the advantageous effect tends to be more suitably achieved.

The BR may be an unmodified or modified BR. Examples of the modified BR include those into which the above-mentioned functional groups are introduced. Preferred embodiments are as described for the modified SBR.

The BR may be a commercial product of, for example, Ube Industries, Ltd., JSR Corporation, Asahi Kasei Corporation, or Zeon Corporation.

The amount of BR based on 100% by mass of the rubber component is preferably 5% by mass or more, more preferably 10% by mass or more, but is preferably 70% by mass or less, more preferably 40% by mass or less, still more preferably 30% by mass or less. When the amount is within the range indicated above, the advantageous effect tends to be more suitably achieved.

Examples of the isoprene-based rubbers include natural rubber (NR), polyisoprene rubber (IR), refined NR, modified NR, and modified IR. The NR may be one commonly used in the tire industry such as SIR20, RSS #3, or TSR20. Non-limiting examples of the IR include those commonly used in the tire industry such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These may be used alone or in combinations of two or more. Among these, NR is preferred.

The amount of isoprene-based rubbers based on 100% by mass of the rubber component is preferably 3% by mass or more, more preferably 5% by mass or more, but is preferably 60% by mass or less, more preferably 30% by mass or less, still more preferably 20% by mass or less. When the amount is within the range indicated above, the advantageous effect tends to be more suitably achieved.

Herein, the weight average molecular weight (Mw) and number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The cis content (cis-1,4-butadiene unit content) and vinyl content (1,2-butadiene unit content) can be measured by infrared absorption spectrometry. The styrene content can be measured by $^1$H-NMR analysis.

The rubber composition preferably contains a polymer having a carbon-carbon double bond and a heteroatom. More preferably, it contains a diene rubber and a polymer having a carbon-carbon double bond and a heteroatom.

The carbon-carbon double bond is necessary for crosslinking with the diene rubber. The number of such bonds is not limited.

The term "heteroatom" refers to an atom other than carbon and hydrogen atoms. It may be any heteroatom capable of forming a reversible molecular bond, such as a hydrogen bond or an ionic bond, with water. The heteroatom is preferably at least one atom selected from the group consisting of an oxygen atom, a nitrogen atom, a silicon atom, a sulfur atom, a phosphorus atom, and halogen atoms, more preferably at least one atom selected from the group consisting of an oxygen atom, a nitrogen atom, and a silicon atom, still more preferably an oxygen atom.

Thus, the rubber composition preferably contains a diene rubber and "a polymer having a carbon-carbon double bond and at least one atom selected from the group consisting of an oxygen atom, a nitrogen atom, a silicon atom, a sulfur atom, a phosphorus atom, and halogen atoms". More preferably, it contains a diene rubber and "a polymer having a carbon-carbon double bond and at least one atom selected from the group consisting of an oxygen atom, a nitrogen atom, and a silicon atom". Still more preferably, it contains a diene rubber and "a polymer having a carbon-carbon double bond and an oxygen atom". Moreover, the heteroatom is preferably present in the main chain (backbone) of the polymer, more preferably in the repeating unit of the polymer.

Examples of structures or groups having an oxygen atom include ether, ester, carboxy, carbonyl, alkoxy, and hydroxy groups. Among these, ether groups are preferred, with oxyalkylene groups being more preferred.

Examples of structures or groups having a nitrogen atom include amino (primary, secondary, and tertiary amino groups), amide, nitrile, and nitro groups. Among these, amino groups are preferred, with tertiary amino groups being more preferred.

Examples of structures or groups having a silicon atom include silyl, alkoxysilyl, and silanol groups. Among these, silyl groups are preferred, with alkoxysilyl groups being more preferred.

Examples of structures or groups having a sulfur atom include sulfide, sulfate, and sulfo groups, and sulfates.

Examples of structures or groups having a phosphorus atom include phosphate groups and phosphates.

Examples of structures or groups having halogen atoms include halogeno groups such as fluoro, chloro, bromo, and iodo groups.

The term "oxyalkylene group" refers to a group represented by -(AO)—, preferably a group represented by -(AO)$_n$— wherein n represents the number of repeating units.

The number of carbons in the alkylene group A of the oxyalkylene group AO is preferably 1 or more, more preferably 2 or more, but is preferably 10 or less, more preferably 8 or less, still more preferably 6 or less. When the carbon number is within the range indicated above, the advantageous effect tends to be more suitably achieved.

The alkylene group A of the oxyalkylene group AO may be either linear or branched, but is preferably branched to form a bulkier structure so that the advantageous effect can be more suitably achieved.

To more suitably achieve the advantageous effect, the AO is preferably a C2-C3 oxyalkylene group (an oxyethylene group (EO), an oxypropylene group (PO)) or a C2-C3 oxyalkylene group attached to a branched chain $R^4$ ($R^4$ represents a hydrocarbon group optionally having a heteroatom), more preferably a combination of a C2-C3 oxyalkylene group and a C2-C3 oxyalkylene group attached to a branched chain $R^4$. The branched chain $R^4$ is preferably attached to a carbon atom adjacent to the oxygen atom.

The hydrocarbon group optionally having a heteroatom as $R^4$ is not limited. The number of carbons in the hydrocarbon group is preferably 1 or more, more preferably 2 or more, but is preferably 10 or less, more preferably 6 or less, still more preferably 4 or less. When the carbon number is within the range indicated above, the advantageous effect tends to be more suitably achieved.

A preferred example of the hydrocarbon group optionally having a heteroatom as $R^4$ is a group represented by the following formula.

The group represented by -(AO)— still more preferably includes a group represented by the following formula (B), particularly preferably groups represented by the following formulas (A) and (B), optionally in combination with a group represented by the following formula (C).

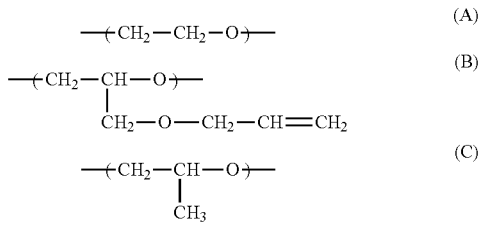

When the polymer has at least two types of oxyalkylene groups, the oxyalkylene groups may be arranged blockwise or randomly.

The polymer is preferably a polymer having the group (structural unit) of formula (B), more preferably a polymer having the groups (structural units) of formulas (A) and (B).

The amount of the group (structural unit) of formula (B) based on 100 mol % of the polymer is preferably 2 mol % or more, more preferably 5 mol % or more, but is preferably 50 mol % or less, more preferably 40 mol % or less, still more preferably 30 mol % or less, particularly preferably 20 mol % or less.

The polymer preferably has a weight average molecular weight (Mw) of 10,000 or more, more preferably 50,000 or more, still more preferably 100,000 or more, particularly preferably 500,000 or more, but preferably 3,000,000 or less, more preferably 2,500,000 or less, still more preferably 2,000,000 or less, particularly preferably 1,500,000 or less, most preferably 1,000,000 or less.

The polymer preferably includes at least 5% by mass, more preferably at least 10% by mass, still more preferably at least 30% by mass, particularly preferably at least 50% by mass, most preferably at least 70% by mass, still most preferably at least 80% by mass, further most preferably at least 90% by mass, of insolubles (water-insolubles) when suspended in an amount of 1 g per 10 mL of water. The upper limit of the amount of such insolubles is not limited.

The amount of such insolubles can be measured as described in EXAMPLES.

A larger amount of such insolubles indicates that less dissolution of the polymer into water will occur when the rubber compound is wetted with water, and therefore reversible changes in hardness can be more suitably achieved.

The polymer preferably includes at least 5% by mass, more preferably at least 10% by mass, still more preferably at least 30% by mass, particularly preferably at least 50% by mass, most preferably at least 70% by mass, still most preferably at least 90% by mass of insolubles (THF-insolubles) when suspended in an amount of 1 g per 10 mL of tetrahydrofuran. The upper limit of the amount of such insolubles is not limited.

The amount of such insolubles can be measured as described in EXAMPLES.

Since diene rubbers are soluble in tetrahydrofuran, the polymer with a larger amount of insolubles in tetrahydrofuran has less compatibility with diene rubbers, and therefore the effect of decrease in hardness when water-wet tends to be sufficiently achieved.

The polymer may be a commercial product. Alternatively, it may be prepared by producing a polymer from a monomer having a heteroatom.

The monomer having a heteroatom is not limited. Examples of such monomers having an oxygen atom include ethers such as vinyl ethers, alkoxystyrenes, allyl glycidyl ether, ethylene oxide, propylene oxide, and tetrahydrofuran; (meth)acrylic acids and esters or acid anhydrides thereof. Examples of such monomers having a nitrogen atom include acrylonitrile, N-vinylcarbazole, carbamic acid, and caprolactam. Examples of such monomers having a silicon atom include alkoxysilylstyrenes and alkoxysilylvinyls.

When the monomer having a heteroatom has no unsaturated bond, the monomer having a heteroatom may be polymerized together with a monomer having a carbon-carbon double bond (for example, a conjugated diene monomer such as butadiene or isoprene, or a vinyl polymer such as styrene).

The polymerization may be performed by any method including known methods.

The amount of the polymer per 100 parts by mass of the rubber component is preferably 5 parts by mass or more, more preferably 10 parts by mass or more, still more preferably 20 parts by mass or more, particularly preferably 30 parts by mass or more, most preferably 40 parts by mass or more, still most preferably 50 parts by mass or more, further most preferably 60 parts by mass or more, particularly most preferably 70 parts by mass or more, but is preferably 150 parts by mass or less, more preferably 100 parts by mass or less. When the amount is within the range indicated above, the advantageous effect tends to be better achieved.

The rubber composition may contain silica.

Examples of the silica include dry silica (silicic anhydride) and wet silica (hydrous silicic acid). Wet silica is preferred because it contains a large number of silanol groups. These may be used alone or in combinations of two or more.

The silica has a nitrogen adsorption specific surface area ($N_2SA$) of 40 $m^2/g$ or more, preferably 60 $m^2/g$ or more, more preferably 80 $m^2/g$ or more, still more preferably 160 $m^2/g$ or more. The $N_2SA$ is also preferably 600 $m^2/g$ or less, more preferably 300 $m^2/g$ or less, still more preferably 250 $m^2/g$ or less, particularly preferably 200 $m^2/g$ or less. When the $N_2SA$ is within the range indicated above, the advantageous effect tends to be more suitably achieved.

Herein, the $N_2SA$ of the silica is determined by the BET method in accordance with ASTM D3037-81.

The silica may be a commercial product of, for example, Degussa, Rhodia, Tosoh Silica Corporation, Solvay Japan, or Tokuyama Corporation.

The amount of the silica per 100 parts by mass of the rubber component is preferably 5 parts by mass or more, more preferably 10 parts by mass or more, still more preferably 15 parts by mass or more, but is preferably 150 parts by mass or less, more preferably 100 parts by mass or less, still more preferably 80 parts by mass or less, particularly preferably 60 parts by mass or less, most preferably 40 parts by mass or less. When the amount is within the range indicated above, the advantageous effect tends to be better achieved.

The amount of the silica based on 100% by mass of the total fillers (reinforcing fillers) in the rubber composition is preferably 10% by mass or more, more preferably 20% by mass or more, still more preferably 30% by mass or more. The upper limit is not limited but is preferably 90% by mass or less, more preferably 70% by mass or less, still more preferably 50% by mass or less. When the amount is within the range indicated above, the advantageous effect tends to be more suitably achieved.

The rubber composition containing silica preferably further contains a silane coupling agent.

Any silane coupling agent may be used, and examples include sulfide silane coupling agents such as
bis(3-triethoxysilylpropyl)tetrasulfide,
bis(2-triethoxysilylethyl)tetrasulfide,
bis(4-triethoxysilylbutyl)tetrasulfide,
bis(3-trimethoxysilylpropyl)tetrasulfide,
bis(2-trimethoxysilylethyl)tetrasulfide,
bis(2-triethoxysilylethyl)trisulfide,
bis(4-triethoxysilylbutyl)trisulfide,
bis(3-triethoxysilylpropyl)disulfide,
bis(2-triethoxysilylethyl)disulfide,
bis(4-triethoxysilylbutyl)disulfide,
bis(3-trimethoxysilylpropyl) disulfide,
bis(2-trimethoxysilylethyl)disulfide,
bis(4-trimethoxysilylbutyl)disulfide,
3-trimethoxysilylpropyl-N,N-dimethylthiocarbamoyl tetrasulfide,
2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane and
2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Examples of usable commercially available silane coupling agents include products of Degussa, Momentive, Shin-Etsu Silicone, Tokyo Chemical Industry Co., Ltd., AZmax. Co., and Dow Corning Toray Co., Ltd. These may be used alone or in combinations of two or more. Among these, sulfide silane coupling agents and mercapto silane coupling agents are preferred because then the advantageous effect tends to be better achieved. More preferred are disulfide silane coupling agents having disulfide bonds such as bis(3-triethoxysilylpropyl)disulfide.

The amount of the silane coupling agent per 100 parts by mass of the silica is preferably 3 parts by mass or more, more preferably 5 parts by mass or more, but is preferably 20 parts by mass or less, more preferably 15 parts by mass or less. When the amount is within the range indicated above, the advantageous effect tends to be better achieved.

The rubber composition may contain carbon black.

Non-limiting examples of the carbon black include N134, N110, N220, N234, N219, N339, N330, N326, N351, N550, and N762. These may be used alone or in combinations of two or more.

The carbon black preferably has a nitrogen adsorption specific surface area ($N_2SA$) of 80 $m^2/g$ or more, more preferably 100 $m^2/g$ or more, but preferably 150 $m^2/g$ or less, more preferably 130 $m^2/g$ or less. When the $N_2SA$ is within the range indicated above, the advantageous effect tends to be better achieved.

Herein, the $N_2SA$ of the carbon black is measured in accordance with JIS K6217-2:2001.

The carbon black may be a commercial product of, for example, Asahi Carbon Co., Ltd., Cabot Japan K.K., Tokai Carbon Co., Ltd., Mitsubishi Chemical Corporation, Lion Corporation, NSCC Carbon Co., Ltd, or Columbia Carbon.

The amount of the carbon black per 100 parts by mass of the rubber component is preferably 5 parts by mass or more, more preferably 10 parts by mass or more, still more preferably 20 parts by mass or more, particularly preferably 30 parts by mass or more, but is preferably 150 parts by mass or less, more preferably 100 parts by mass or less, still more preferably 80 parts by mass or less, particularly preferably 60 parts by mass or less, most preferably 50 parts by mass or less. When the amount is within the range indicated above, the advantageous effect tends to be better achieved.

The rubber composition may contain an oil.

Examples of the oil include process oils, plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combinations of two or more. To well achieve the advantageous effect, process oils are preferred among these, with aromatic process oils being more preferred.

The oil may be a commercial product of, for example, Idemitsu Kosan Co., Ltd., Sankyo Yuka Kogyo K.K., Japan Energy Corporation, Olisoy, H&R, Hokoku Corporation, Showa Shell Sekiyu K.K., or Fuji Kosan Co., Ltd.

The amount of the oil per 100 parts by mass of the rubber component is preferably 5 parts by mass or more, more preferably 10 parts by mass or more, still more preferably 20 parts by mass or more, but is preferably 50 parts by mass or less, more preferably 35 parts by mass or less. When the amount is within the range indicated above, the advantageous effect tends to be better achieved. The amount of the oil includes the amount of the oil, if present in the rubbers (oil extended rubbers) used.

The rubber composition may contain a resin.

Any resin generally used in the tire industry may be used, and examples include rosin-based resins, coumarone indene resins, α-methylstyrene-based resins, terpene-based resins, p-t-buthylphenol acetylene resins, acrylic resins, C5 resins, and C9 resins. Examples of usable commercially available resins include products of Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., Taoka Chemical Co., Ltd., and Toagosei Co., Ltd. These may be used alone or in combinations of two or more.

The amount of the resin per 100 parts by mass of the rubber component is preferably 1 part by mass or more, more preferably 5 parts by mass or more, but is preferably 30 parts by mass or less, more preferably 20 parts by mass or less. When the amount is within the range indicated above, the advantageous effect tends to be better achieved.

The rubber composition may contain a wax.

Non-limiting examples of the wax include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Among these, petroleum waxes are preferred, with paraffin waxes being more preferred.

The wax may be a commercial product of, for example, Ouchi Shinko Chemical Industrial Co., Ltd., Nippon Seiro Co., Ltd., or Seiko Chemical Co., Ltd.

The amount of the wax per 100 parts by mass of the rubber component is preferably 0.3 parts by mass or more, more preferably 0.5 parts by mass or more, but is preferably 20 parts by mass or less, more preferably 10 parts by mass or less. When the amount is within the range indicated above, the advantageous effect tends to be better achieved.

The rubber composition may contain an antioxidant.

Examples of the antioxidant include naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)propionate]methane. These may be used alone or in combinations of two or more. Among these, p-phenylenediamine antioxidants and/or quinoline antioxidants are preferred.

The antioxidant may be a commercial product of, for example, Seiko Chemical Co., Ltd., Sumitomo Chemical Co., Ltd., Ouchi Shinko Chemical Industrial Co., Ltd., or Flexsys.

The amount of the antioxidant per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain stearic acid.

The stearic acid may be a conventional one, and examples include products of NOF Corporation, Kao Corporation, FUJIFILM Wako Pure Chemical Corporation, and Chiba Fatty Acid Co., Ltd.

The amount of the stearic acid per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain zinc oxide.

The zinc oxide may be a conventional one, and examples include products of Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be a commercial product of, for example, Tsurumi Chemical Industry Co., Ltd., Karuizawa sulfur Co., Ltd., Shikoku Chemicals Corporation, Flexsys, Nippon Kanryu Industry Co., Ltd., or Hosoi Chemical Industry Co., Ltd.

The amount of the sulfur per 100 parts by mass of the rubber component is preferably 0.1 parts by mass or more, more preferably 0.5 parts by mass or more, but is preferably 10 parts by mass or less, more preferably 5 parts by mass or less, still more preferably 3 parts by mass or less. When the amount is within the range indicated above, the advantageous effect tends to be better achieved.

The rubber composition may contain a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-tert-butyl-2-benzothiazolylsulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. To more suitably achieve the advantageous effect, sulfenamide vulcanization accelerators and guanidine vulcanization accelerators are preferred among these. More preferred are combinations of sulfenamide vulcanization accelerators and guanidine vulcanization accelerators.

The vulcanization accelerator may be a commercial product of, for example, Kawaguchi Chemical Industry Co., Ltd. or Ouchi Shinko Chemical Industrial Co., Ltd.

The amount of the vulcanization accelerator per 100 parts by mass of the rubber component is preferably 1 part by mass or more, more preferably 2 parts by mass or more, but is preferably 10 parts by mass or less, more preferably 7 parts by mass or less. When the amount is within the range indicated above, the advantageous effect tends to be better achieved.

In addition to the above-mentioned components, the rubber composition may further contain additives commonly used in the tire industry, including, for example, organic peroxides, and fillers such as calcium carbonate, talc, alumina, clay, aluminum hydroxide, and mica. The amount of such additives per 100 parts by mass of the rubber component is preferably 0.1 to 200 parts by mass.

The rubber composition may be prepared, for example, by kneading the components in a rubber kneading machine such as an open roll mill or Banbury mixer, and vulcanizing the kneaded mixture.

The kneading conditions are as follows: in a base kneading step of kneading additives other than vulcanizing agents and vulcanization accelerators, the kneading temperature is usually 100 to 180° C., preferably 120 to 170° C.; and in a final kneading step of kneading vulcanizing agents and vulcanization accelerators, the kneading temperature is usually 120° C. or lower, preferably 80 to 110° C. Then, the composition obtained by kneading vulcanizing agents and vulcanization accelerators is usually vulcanized by press vulcanization, for example. The vulcanization temperature is usually 140 to 190° C., preferably 150 to 185° C. The vulcanization time is usually 5 to 15 minutes.

The rubber composition may be used in tire components (i.e., as a rubber composition for tires) such as treads (cap treads), sidewalls, base treads, undertreads, shoulders, clinches, bead apexes, breaker cushion rubbers, rubbers for carcass cord topping, insulations, chafers, and innerliners, and side reinforcement layers of run-flat tires. The rubber composition is especially suitable for use in tire components which may be in contact with water (treads, sidewalls, shoulders), more suitably in treads. In the case of a tread consisting of a cap tread and a base tread, the rubber composition may be suitably used in the cap tread.

Examples of the tire components which may be in contact with water include components located at the outermost surface of new tires or of running tires which are being worn (treads, sidewalls, shoulders).

The tire (e.g., pneumatic tire) of the present invention can be produced from the rubber composition by usual methods. Specifically, the unvulcanized rubber composition containing additives as needed may be extruded according to the shape of a tire component (in particular, a tread (cap tread)) and formed and assembled with other tire components in a tire building machine by a usual method to build an unvulcanized tire, which may then be heated and pressurized in a vulcanizer to produce a tire.

It is sufficient that the tire component (e.g., tread) of the tire at least partially include the rubber composition. The whole tire component may include the rubber composition.

The tire is suitable for use as, for example, a tire for passenger vehicles, large passenger vehicles, large SUVs, trucks and buses, or two-wheeled vehicles, or as a racing tire, studless winter tire (winter tire), all-season tire, run-flat tire, aircraft tire, or mining tire.

EXAMPLES

The present invention is specifically described with reference to, but not limited to, examples.

Production Example 1

A nitrogen-purged autoclave reactor was charged with hexane, 1,3-butadiene, styrene, tetrahydrofuran, and ethylene glycol diethyl ether. Subsequently, solutions of bis(diethylamino)methylvinylsilane and n-butyllithium in cyclohexane and n-hexane, respectively, were introduced to initiate polymerization.

Copolymerization of 1,3-butadiene and styrene was carried out for three hours at a stirring rate of 130 rpm and a temperature inside the reactor of 65° C. while continuously feeding the monomers into the reactor. Next, the resulting polymer solution was stirred at a stirring rate of 130 rpm, and N-(3-dimethylaminopropyl)acrylamide was added, followed by a reaction for 15 minutes. After completion of the polymerization reaction, 2,6-di-tert-butyl-p-cresol was added. Then, the solvents were removed by steam stripping, and the resulting product was dried on hot rolls adjusted at 110° C. to obtain a modified styrene-butadiene rubber (SBR).

(Production Example 2) Synthesis of Polymer 1
(Epoxide/Allyl Glycidyl Ether Copolymer)

A nitrogen-purged glass flask was charged with 500 mL of diethyl ether. After the internal temperature was cooled to 0° C. or lower, 10 mL of a 0.55 mol/L solution of triisobutylaluminum in hexane was added, and then a 0.55 mol/L ethanol/diethyl ether solution was dropwise added while ensuring that the internal temperature did not exceed 10° C. Subsequently, a solution prepared by mixing 200 g in total of ethylene oxide and allyl glycidyl ether in a molar ratio of 9:1 was dropwise added while ensuring that the internal temperature did not exceed 10° C., followed by stirring for eight hours. Next, the solvents were evaporated under reduced pressure at an external temperature of 50° C. and an internal pressure of 1.0 kPa or less, and then the residue was suspended in water and filtered. The filtration residue was washed with THF and then dried under reduced pressure at 50° C. and 1 kPa or less until it reached a constant weight, thereby obtaining Polymer 1 (the infrared absorption spectrum showed ether and carbon-carbon peaks derived from formula (A) and formula (B), respectively; the weight average molecular weight (Mw) was 780,000; and the amount of the group (structural unit) of formula (B) based on 100 mol % of the polymer was 8 mol %) at a yield of 80%.

(Production Example 3) Synthesis of Polymer 2
(Amine/Allyl Glycidyl Ether Copolymer)

By following the procedure of Production Example 2, but replacing ethylene oxide with triglycidyl amine, a polymer of triglycidyl amine and allyl glycidyl ether was obtained as Polymer 2 (the same analysis as in Production Example 2 showed amine absorption and carbon-carbon double bond peaks; the weight average molecular weight was 980,000; and the amount of the group (structural unit) of formula (B) based on 100 mol % of the polymer was 8 mol %) at a yield of 80%.

(Production Example 4) Synthesis of Polymer 3 (Silyl/Allyl Glycidyl Ether Copolymer)

By following the procedure of Production Example 2, but replacing ethylene oxide with triethoxysilyl glycidyl ether, a polymer of triethoxysilyl glycidyl ether and allyl glycidyl ether was obtained as Polymer 3 (the same analysis as in Production Example 2 showed silanol absorption and carbon-carbon double bond peaks; the weight average molecular weight was 640,000; and the amount of the group (structural unit) of formula (B) based on 100 mol % of the polymer was 8 mol %) at a yield of 80%.

(Production Example 5) Synthesis of Polymer 4 (Ethylene Oxide/Allyl Glycidyl Ether/Halogen-Based Monomer Copolymer)

By following the procedure of Production Example 2, but using ethylene oxide, allyl glycidyl ether, and epichlorohydrin in a molar ratio of 8:1:1, a polymer of ethylene oxide, allyl glycidyl ether, and epichlorohydrin was obtained as Polymer 4 (the same analysis as in Production Example 2 showed ether, carbon-carbon double bond, and carbon-chlorine bond peaks derived from formula (A), formula (B), and epichlorohydrin, respectively; the weight average molecular weight was 620,000; and the amounts of the group (structural unit) of formula (B) and the chlorine-carbon bond structural unit, each based on 100 mol % of the polymer, were 8 mol % and 11 mol %, respectively) at a yield of 78%.

(Production Example 6) Synthesis of Polymer 5 (Ethylene Oxide/Allyl Glycidyl Ether/Phosphorus-Based Monomer Copolymer)

By following the procedure of Production Example 2, but using ethylene oxide, allyl glycidyl ether, and 2-oxiranylmethyl phosphoric acid dimethyl ester in a molar ratio of 8:1:1, a polymer of ethylene oxide, allyl glycidyl ether, and 2-oxiranylmethyl phosphoric acid dimethyl ester was obtained as Polymer 5 (the same analysis as in Production Example 2 showed ether, carbon-carbon double bond, and phosphorus-oxygen bond peaks derived from formula (A), formula (B), and 2-oxiranylmethyl phosphoric acid dimethyl ester, respectively; the weight average molecular weight was 670,000; and the amounts of the group (structural unit) of formula (B) and the phosphorus-oxygen bond structural unit, each based on 100 mol % of the polymer, were 8 mol % and 11 mol %, respectively) at a yield of 78%.

(Production Example 7) Synthesis of Polymer 6 (Ethylene Oxide/Allyl Glycidyl Ether/Sulfur-Based Monomer Copolymer)

By following the procedure of Production Example 2, but using ethylene oxide, allyl glycidyl ether, and 2-[(methylthio)methyl]oxirane in a molar ratio of 8:1:1, a polymer of ethylene oxide, allyl glycidyl ether, and 2-[(methylthio)methyl]oxirane was obtained as Polymer 6 (the same analysis as in Production Example 2 showed ether, carbon-carbon double bond, and sulfur-carbon bond peaks derived from formula (A), formula (B), and 2-[(methylthio)methyl]-oxirane, respectively; the weight average molecular weight was 650,000; and the amounts of the group (structural unit) of formula (B) and the sulfur-carbon bond structural unit, each based on 100 mol % of the polymer, were 8 mol % and 11 mol %, respectively) at a yield of 78%.

These Polymers 1 to 6 were evaluated as described below.

<Measurement of Water-Insolubles>

An amount of 1 g of each polymer was weighed in a glass flask, and 10 mL of water was poured therein, followed by stirring at an internal temperature of 66° C. for 10 minutes. Then, stirring was continued until the internal temperature reached 25° C. or lower. The resulting mixture was filtered through a filter paper made of cellulose with a mesh size of 5 C. After the residue left on the filter paper was dried at a temperature of 80° C. and an internal pressure of 0.1 kPa or less for eight hours, the weight of the dried residue was measured. The amount of water-insolubles was determined using the following equation.

Amount of water-insolubles (% by mass)=Weight (g) of dried residue/Initial weight (g) of polymer× 100

<Measurement of THF-Insolubles>

An amount of 1 g of each polymer was weighed in a glass flask, and 10 mL of tetrahydrofuran was poured therein, followed by stirring at an internal temperature of 66° C. for 10 minutes. Then, stirring was continued until the internal temperature reached 25° C. or lower. The resulting mixture was filtered through a filter paper made of cellulose with a mesh size of 5 C. After the residue left on the filter paper was dried at a temperature of 80° C. and an internal pressure of 0.1 kPa or less for eight hours, the weight of the dried residue was measured. The amount of THF-insolubles was determined using the following equation.

Amount of THF-insolubles (% by mass)=Weight (g) of dried residue/Initial weight (g) of polymer× 100

The chemicals used in the examples and comparative example are listed below.

SBR: SBR synthesized as described above (modified S-SBR, styrene content: 25% by mass, vinyl content: 59 mol %, not extended with oil)
BR: BR150B (cis content: 97% by mass) available from Ube Industries, Ltd.
NR: TSR20
Polymer 1: Polymer 1 synthesized as described above (water-insolubles: 96% by mass, THF-insolubles: 96% by mass)
Polymer 2: Polymer 2 synthesized as described above (water-insolubles: 82% by mass, THF-insolubles: 96% by mass)
Polymer 3: Polymer 3 synthesized as described above (water-insolubles: 92% by mass, THF-insolubles: 92% by mass)
Polymer 4: Polymer 4 synthesized as described above (water-insolubles: 97% by mass, THF-insolubles: 97% by mass)
Polymer 5: Polymer 5 synthesized as described above (water-insolubles: 95% by mass, THF-insolubles: 95% by mass)
Polymer 6: Polymer 6 synthesized as described above (water-insolubles: 94% by mass, THF-insolubles: 96% by mass)

Silica: ZEOSIL 1165MP ($N_2SA$: 160 $m^2/g$) available from Rhodia
Carbon black: Seast 9H (DBP oil absorption: 115 mL/100 g, $N_2SA$: 110 $m^2/g$) available from Tokai Carbon Co., Ltd.
Silane coupling agent: Si75 (bis(3-triethoxysilyl-propyl) disulfide) available from Evonik Degussa
Oil: Process X-140 (aromatic process oil) available from Japan Energy Corporation
Wax: Ozoace 0355 available from Nippon Seiro Co., Ltd.
Antioxidant: Santoflex 13 (N-(1,3-dimethylbutyl)-N'-phenyl-p-phenylenediamine, 6PPD) available from Flexsys
Stearic acid: stearic acid "TSUBAKI" available from NOF Corporation
Zinc oxide: zinc oxide #2 available from Mitsui Mining & Smelting Co., Ltd.
Sulfur: powdered sulfur available from Tsurumi Chemical Industry Co., Ltd.
Vulcanization accelerator 1: NOCCELER NS (N-tert-butyl-2-benzothiazolylsulfenamide) available from Ouchi Shinko Chemical Industrial Co., Ltd.
Vulcanization accelerator 2: NOCCELER D (1,3-diphenylguanidine) available from Ouchi Shinko Chemical Industrial Co., Ltd.

Examples and Comparative Example

According to each formulation shown in Table 1, the chemicals other than the sulfur and vulcanization accelerators were kneaded using a 1.7 L Banbury mixer (Kobe Steel, Ltd.) at 160° C. for four minutes to give a kneaded mixture. Then, the kneaded mixture was kneaded with the sulfur and vulcanization accelerators in an open roll mill at 80° C. for four minutes to give an unvulcanized rubber composition.

The unvulcanized rubber composition was press-vulcanized at 170° C. for 12 minutes to give a vulcanized rubber composition.

The vulcanized rubber compositions prepared as above were evaluated as described below. Table 1 shows the results.

(Hardness (Hs) of Vulcanized Rubber)

The shore hardness (Hs, JIS-A hardness) of the vulcanized rubber compositions (test specimens) was measured using a type A durometer in accordance with JIS K6253-3 (2012) "Rubber, vulcanized or thermoplastic—Determination of hardness—Part 3: Durometer method". The measurement was carried out at 25° C.

(Hardness when Water-Wet)

The vulcanized rubber compositions (having a rectangular parallelepiped shape of 30 mm×30 mm×4 mm) were immersed in 20 mL of water at 25° C. for six hours to give water-wet vulcanized rubber compositions. The hardness of the water-wet vulcanized rubber compositions was determined as described above and reported as hardness when water-wet.

(Hardness when Dry)

The water-wet vulcanized rubber compositions were dried under reduced pressure at 80° C. and 1 kPa or less until they reached a constant weight, thereby obtaining dried vulcanized rubber compositions. After the temperature of the dried vulcanized rubber compositions was returned to 25° C., the hardness of the dried vulcanized rubber compositions was determined as described above and reported as hardness when dry.

(Hardness when Re-Wet with Water)

The dried vulcanized rubber compositions (having a rectangular parallelepiped shape of 30 mm×30 mm×4 mm) were immersed in 20 mL of water at 25° C. for six hours to give vulcanized rubber compositions re-wet with water. The hardness of the vulcanized rubber compositions re-wet with water was determined as described above and reported as hardness when re-wet with water.

(Tan δ when Dry)

The tan δ at 70° C. of the dried vulcanized rubber compositions was measured using a viscoelastic spectrometer VES (Iwamoto Seisakusho Co., Ltd.). The measurement conditions were as follows: a measurement temperature of 70° C., an initial strain of 10%, a dynamic strain of 2%, and a frequency of 10 Hz.

(Fuel Economy Index)

Each unvulcanized rubber composition sheet was formed into a tread shape and assembled with other tire components, followed by press-vulcanization at 170° C. for 12 minutes to prepare a test tire (size: 195/65R15). Each test tire was run in a rolling resistance tester under conditions including a rim of 15×6JJ, an internal pressure of 230 kPa, a load of 3.43 kN, and a speed of 80 km/h to determine the rolling resistance. The rolling resistances are expressed as an index (fuel economy index), with Comparative Example 1 set equal to 100. A higher index indicates better fuel economy.

(Wet Grip Performance Index)

Each unvulcanized rubber composition sheet was formed into a tread shape and assembled with other tire components, followed by press-vulcanization at 170° C. for 12 minutes to prepare a kart tire (tire size: 11×1.10-5). Each set of kart tires were mounted on a kart. A test driver drove the kart eight laps around a test track of 2 km per lap in which the road surface was previously sprinkled with water. Then, the driver rated the grip performance on a scale of 1 to 200 (best), where the grip performance of Comparative Example 1 was set equal to 100.

(Dry Grip Performance Index)

Each unvulcanized rubber composition sheet was formed into a tread shape and assembled with other tire components, followed by press-vulcanization at 170° C. for 12 minutes to prepare a kart tire (tire size: 11×1.10-5). Each set of kart tires were mounted on a kart. A test driver drove the kart eight laps around a test track of 2 km per lap under dry road conditions. Then, the driver rated the grip performance on a scale of 1 to 200 (best), where the grip performance of Comparative Example 1 was set equal to 100.

TABLE 1

| | | Comparative Example | Example | | | | | | | | | | | | | | |
|---|---|---|---|---|---|---|---|---|---|---|---|---|---|---|---|---|---|
| | | 1 | 1 | 2 | 3 | 4 | 5 | 6 | 7 | 8 | 9 | 10 | 11 | 12 | 13 | 14 | 15 |
| Amount (parts by mass) | SBR | 70 | 70 | 70 | 70 | 70 | 70 | 70 | 70 | 70 | 70 | 70 | 70 | 70 | 70 | 70 | 70 |
| | BR | 20 | 20 | 20 | 20 | 20 | 20 | 20 | 20 | 20 | 20 | 20 | 20 | 20 | 20 | 20 | 20 |
| | NR | 10 | 10 | 10 | 10 | 10 | 10 | 10 | 10 | 10 | 10 | 10 | 10 | 10 | 10 | 10 | 10 |
| | Polymer 1 | — | 40 | 45 | 50 | 55 | 60 | 65 | 70 | 80 | 90 | — | — | — | — | — | — |
| | Polymer 2 | — | — | — | — | — | — | — | — | — | — | 60 | — | — | — | — | — |
| | Polymer 3 | — | — | — | — | — | — | — | — | — | — | — | 60 | — | — | — | — |
| | Polymer 4 | — | — | — | — | — | — | — | — | — | — | — | — | 60 | — | — | — |
| | Polymer 5 | — | — | — | — | — | — | — | — | — | — | — | — | — | 60 | — | — |
| | Polymer 6 | — | — | — | — | — | — | — | — | — | — | — | — | — | — | 60 | 60 |
| | Silica | 20 | 20 | 20 | 20 | 20 | 20 | 20 | 20 | 20 | 20 | 20 | 20 | 20 | 20 | 20 | 20 |
| | Carbon black | 36 | 36 | 36 | 36 | 36 | 36 | 36 | 36 | 36 | 36 | 36 | 36 | 36 | 36 | 36 | 36 |
| | Silane coupling agent | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 |
| | Oil | 25 | 25 | 25 | 25 | 25 | 25 | 25 | 25 | 25 | 25 | 25 | 25 | 25 | 25 | 25 | 25 |
| | Wax | 2 | 2 | 2 | 2 | 2 | 2 | 2 | 2 | 2 | 2 | 2 | 2 | 2 | 2 | 2 | 2 |
| | Antioxidant | 2 | 2 | 2 | 2 | 2 | 2 | 2 | 2 | 2 | 2 | 2 | 2 | 2 | 2 | 2 | 2 |
| | Stearic acid | 2 | 2 | 2 | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Sulfur | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 |
| | Vulcanization accelerator 1 | 2 | 2 | 2 | 2 | 2 | 2 | 2 | 2 | 2 | 2 | 2 | 2 | 2 | 2 | 2 | 2 |
| | Vulcanization accelerator 2 | 1.4 | — | — | — | — | — | — | — | — | — | 1.4 | — | — | — | — | — |
| Evaluation results | Hardness of vulcanized rubber | 60 | 57 | 57 | 56 | 55 | 55 | 56 | 55 | 56 | 56 | 59 | 60 | 60 | 58 | 59 | 58 |
| | Hardness when water-wet (Hs(Wet)) | 60 | 46 | 43 | 42 | 41 | 40 | 38 | 37 | 35 | 32 | 40 | 41 | 45 | 46 | 45 | 47 |
| | Hardness when dry | 60 | 57 | 57 | 57 | 56 | 55 | 57 | 55 | 56 | 56 | 59 | 60 | 60 | 58 | 59 | 58 |
| | Grip index, Hardness when dry-Hs(Wet) | 0 | 11 | 12 | 13 | 14 | 15 | 16 | 18 | 21 | 24 | 19 | 19 | 15 | 12 | 14 | 11 |
| | Hardness when re-wet with water | 60 | 46 | 43 | 42 | 41 | 40 | 38 | 37 | 35 | 32 | 40 | 41 | 45 | 46 | 45 | 47 |
| | tan δ when dry | 0.15 | 0.13 | 0.13 | 0.13 | 0.12 | 0.12 | 0.12 | 0.11 | 0.11 | 0.11 | 0.11 | 0.12 | 0.13 | 0.11 | 0.12 | 0.11 |
| | Fuel economy index | 100 | 115 | 118 | 120 | 112 | 125 | 130 | 136 | 136 | 136 | 131 | 128 | 126 | 136 | 125 | 136 |
| | Wet grip performance index | 100 | 112 | 112 | 113 | 114 | 113 | 113 | 113 | 115 | 120 | 113 | 112 | 111 | 118 | 118 | 115 |
| | Dry grip performance index | 100 | 108 | 108 | 108 | 108 | 108 | 108 | 108 | 109 | 107 | 108 | 108 | 108 | 107 | 106 | 106 |

Table 1 demonstrates that the examples which had a hardness that reversibly changes with water and satisfied the relationship (1) exhibited improved overall performance in terms of wet grip performance and dry grip performance (as shown by the sum of the two indexes: wet grip performance and dry grip performance).

The invention claimed is:

1. A tire, comprising:
 a tire component, the tire component including:
 a rubber composition, having a hardness that reversibly changes with water and satisfying the following relationship (1):

Hardness when dry−Hardness when water-wet≥10 (1)

wherein each hardness represents a JIS-A hardness at 25° C. of the rubber composition,
 wherein the hardness when dry is in a range of 55-60, and the hardness when water-wet is in a range of 32-47.

2. The tire according to claim 1,
 wherein the relationship (1) is as follows:

Hardness when dry−Hardness when water-wet≥11.

3. The tire according to claim 1,
 wherein the relationship (1) is as follows:

Hardness when dry−Hardness when water-wet≥12.

4. The tire according to claim 1,
 wherein the relationship (1) is as follows:

Hardness when dry−Hardness when water-wet≥13.

5. The tire according to claim 1,
 wherein the rubber composition comprises:
 a rubber component that includes a diene rubber; and
 a polymer having a carbon-carbon double bond and a heteroatom.

6. The tire according to claim 5,
 wherein the heteroatom is at least one atom selected from the group consisting of an oxygen atom, a nitrogen atom, a silicon atom, a sulfur atom, a phosphorus atom, and halogen atoms.

7. The tire according to claim 5,
 wherein the polymer comprises at least 5% by mass of insolubles when suspended in an amount of 1 g per 10 mL of water.

8. The tire according to claim 5,
 wherein the polymer comprises at least 5% by mass of insolubles when suspended in an amount of 1 g per 10 mL of tetrahydrofuran.

9. The tire according to claim 5,
 wherein the rubber composition comprises, per 100 parts by mass of the rubber component, at least 5 parts by mass of the polymer.

10. The tire according to claim 1,
 wherein the rubber composition comprises a rubber component that includes an isoprene-based rubber.

11. The tire according to claim 1,
 wherein the rubber composition comprises a rubber component that includes a polybutadiene rubber.

12. The tire according to claim 1,
 wherein the rubber composition has a rubber component that includes a styrene-butadiene rubber content of 95% by mass or less based on 100% by mass of the rubber component.

13. The tire according to claim 1,
 wherein the rubber composition is for use in treads.

14. The tire according to claim 1,
 wherein the tire component is a tread.

* * * * *